Nov. 4, 1941.  H. S. JANDUS  2,261,376
FENDER SHIELD AND ASSEMBLY
Filed June 10, 1940   3 Sheets-Sheet 1
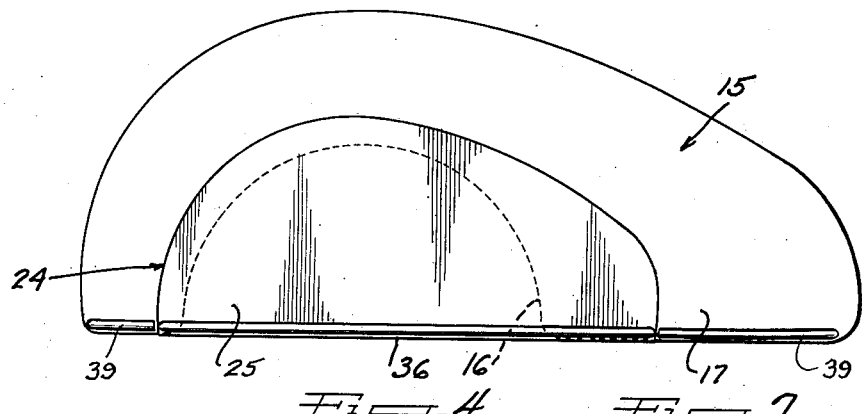
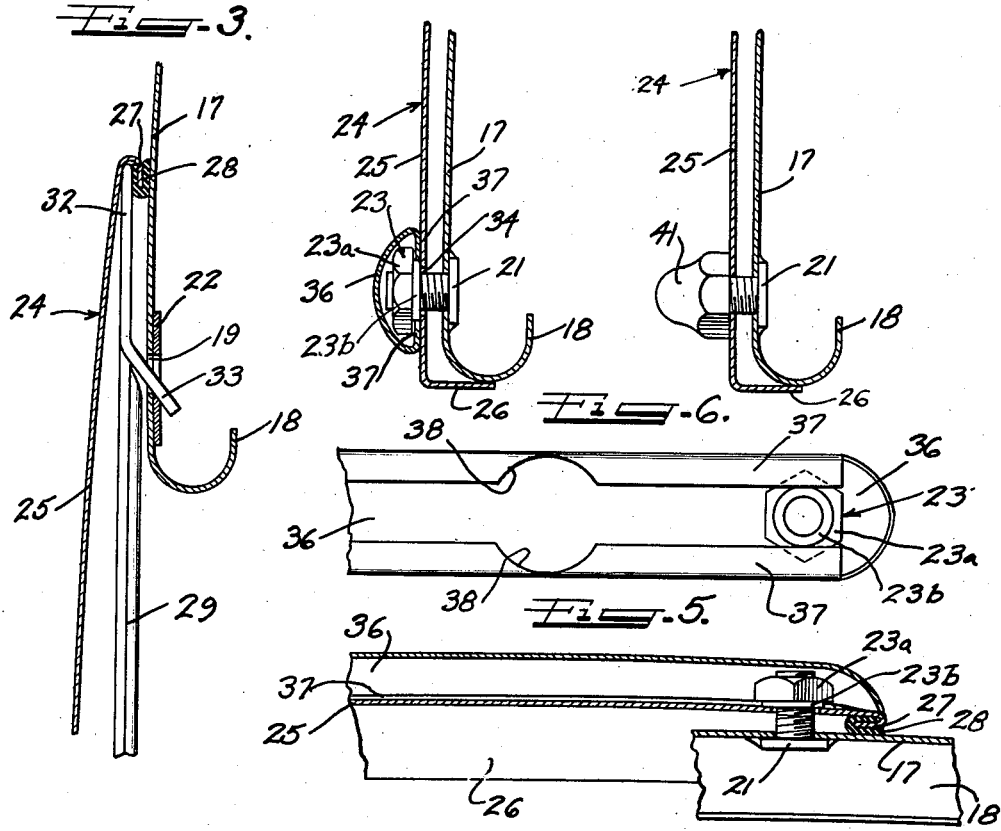
Herbert S. Jandus.

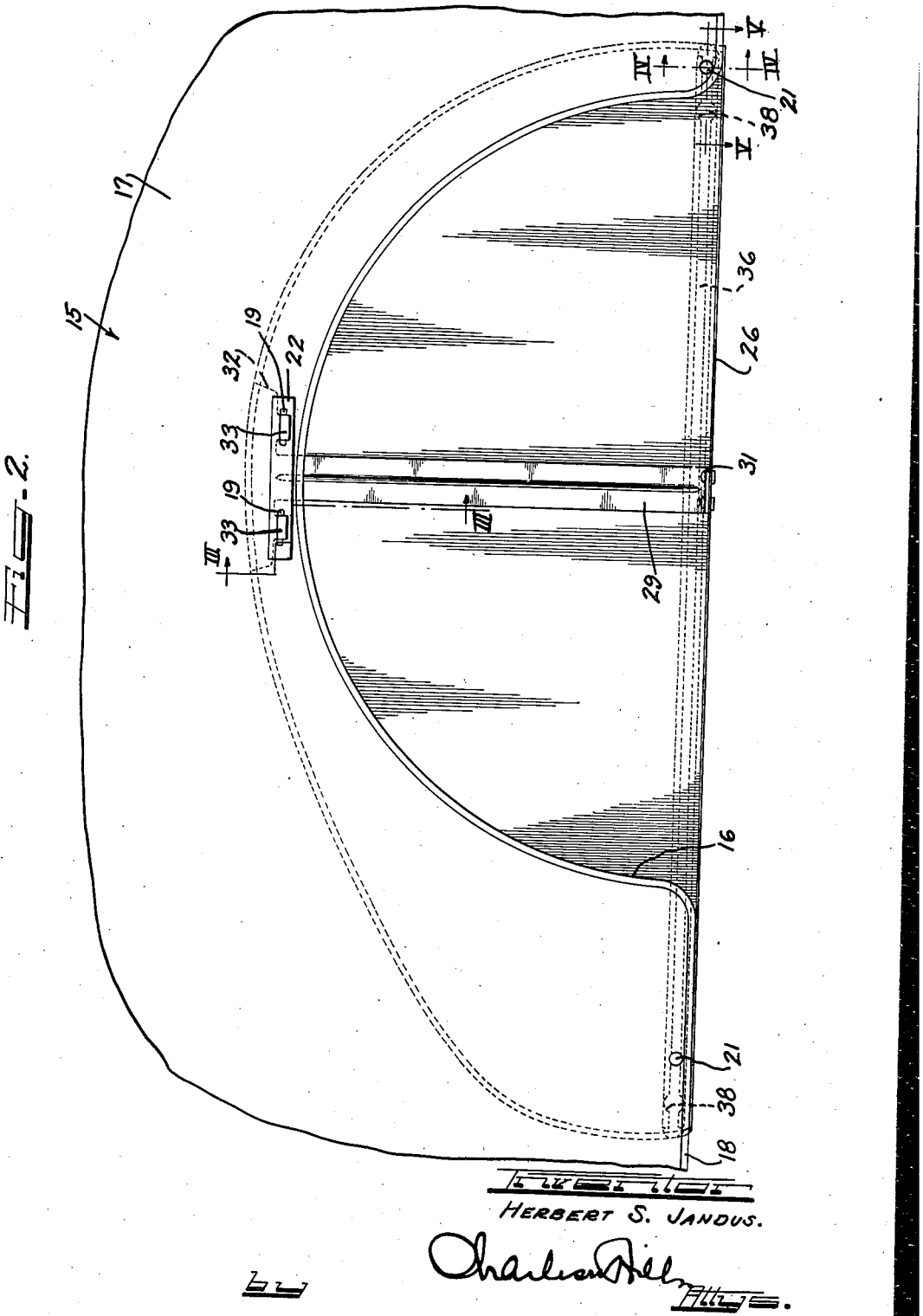

Nov. 4, 1941.  H. S. JANDUS  2,261,376
FENDER SHIELD AND ASSEMBLY
Filed June 10, 1940  3 Sheets-Sheet 3
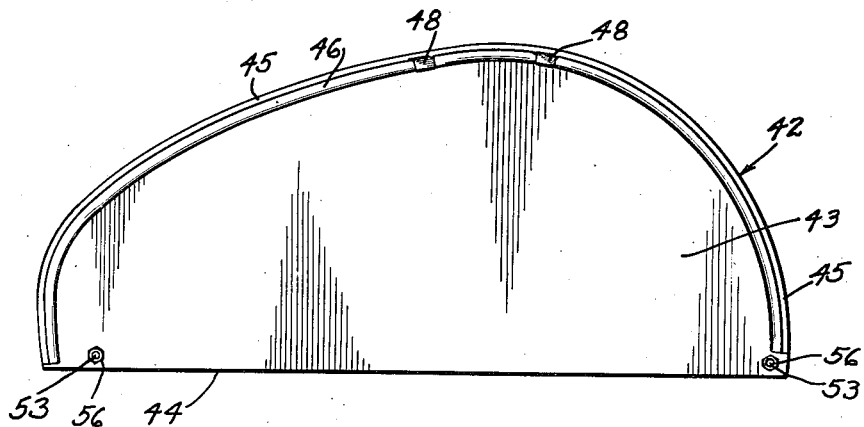
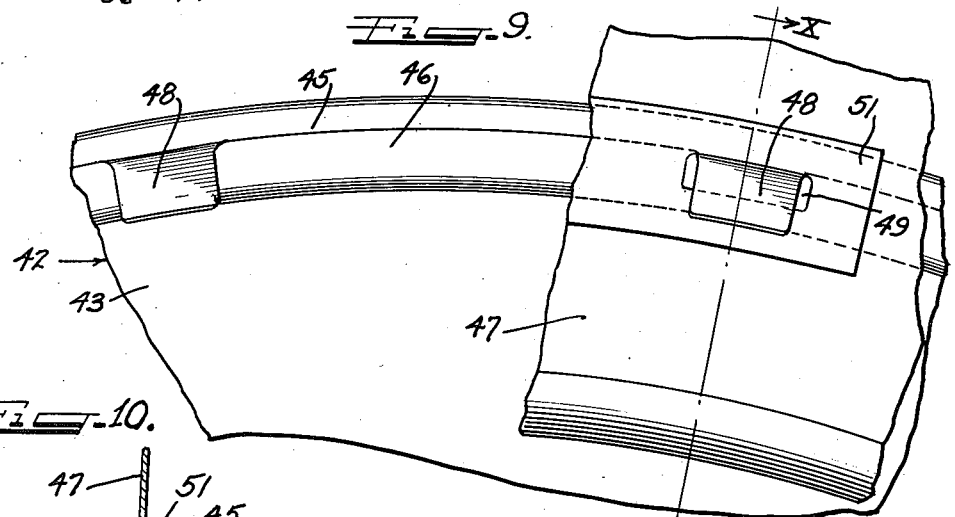
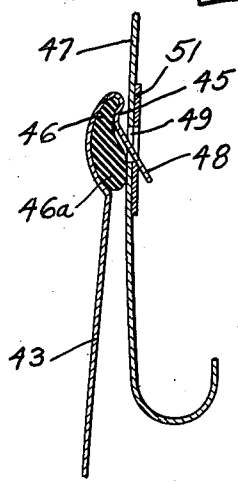
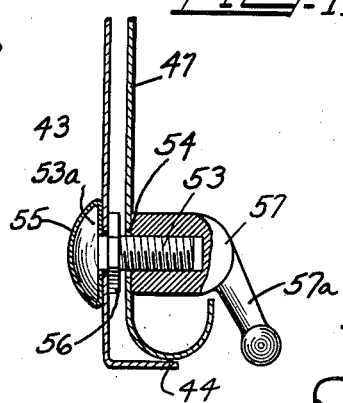
Inventor
HERBERT S. JANDUS.

Patented Nov. 4, 1941

2,261,376

UNITED STATES PATENT OFFICE 2,261,376

FENDER SHIELD AND ASSEMBLY

Herbert S. Jandus, Detroit, Mich., assignor to Houdaille-Hershey Corporation, Detroit, Mich., a corporation of Michigan Application June 10, 1940, Serial No. 339,597

4 Claims. (Cl. 280—153)

This invention relates to means for covering or closing the wheel access opening in the fender or side of a vehicle. In particular, my invention relates to fender shields or fender skirts, as such devices are known when used in connection with a fender, but this invention is equally applicable to automotive vehicles having a body wide enough to enclose the wheels without the use of fenders and in which the wheel access openings are in the sides of the body itself. Bodies of this type are to be found today only among commercial vehicles, such as trucks and busses and are occasionally custom-built for private vehicles, and I wish it to be expressly understood that this invention is equally applicable to such bodies on commercial and private vehicles as well as to fenders. Therefore, while I have referred to my invention as a "fender shield," it is to be clearly understood that this term includes covers for wheel access openings in the side of a body or other wheel enclosing member as well as for wheel access openings in fenders.

In designing ornamental fender shields or skirts of the type adapted to cover the usual wheel access opening in a vehicle fender or body, it is important that the means which is employed to secure the fender shield in position be simple and quick to operate both in assembling the fender shield on the vehicle fender and in removing it therefrom. It must also possess a considerable degree of ruggedness when in use and be substantially free from vibration and noise.

It is an object of this invention to provide a novel ornamental fender shield which possesses the above highly desirable characteristics.

It is a further object of this invention to provide an improved fender shield which is economical to manufacture and which is rugged and reliable in use.

It is a still further object of this invention to provide a novel means for retaining the entire fender-engaging edge portion of an ornamental fender shield in tight engagement with the fender.

Another object of this invention is to provide a novel means of supporting a fender shield on a fender, and which is applicable to various types of fenders whether or not they are especially designed to be used with fender shields.

Another object of this invention is to provide a fender shield in which the mechanism which finally latches the fender shield in position on the fender is disposed entirely near the lower edge of the fender where it may be readily reached either from the outside or under the edge of the fender shield, so that it may be readily operated without the necessity of providing the fender shield with long links or levers as a part of the latching mechanism.

Another object of this invention is to provide a fender and fender shield construction in which the fender shield hooks onto the fender at the top, and in which the lower edge of the fender shield is secured to the fender by bolts which are concealed on the outside of the fender shield by means of an ornamental molding.

The novel features which I believe to be characteristic of my invention are set forth with particularity in the appended claims. My invention itself, however, both as to its organization and manner of construction, together with further objects and advantages thereof, may best be understood by reference to the following description, taken in connection with the accompanying drawings, in which:

Figure 1 is a side elevational view of a vehicle fender having one embodiment of my novel ornamental fender shield mounted thereon;

Figure 2 is an inside elevational view of the form of the invention shown in Figure 1, as seen from the inside of the fender, showing the back or inner side of the fender shield as it appears when mounted on the fender;

Figure 3 is a cross-sectional view taken on the line III—III of Figure 2 and looking in the direction of the arrows;

Figure 4 is a cross-sectional view taken on the line IV—IV of Figure 2 and looking in the direction of the arrows;

Figure 5 is a horizontal sectional view taken on the line V—V of Figure 2 and looking in the direction of the arrows;

Figure 6 is a rear elevational view of one end of the molding appearing in section in Figure 5, showing the relation of the molding to the nuts concealed thereby;

Figure 7 is a cross-sectional view similar to Figure 4 but showing a modified form of the invention;

Figure 8 is a side-elevational view of a modified form of fender shield, the view being taken from the back or inner side of the fender shield;

Figure 9 is a fragmentary view on an enlarged scale of a portion of the fender shield shown in Figure 8 and a portion of the fender upon which it is mounted;

Figure 10 is a cross-section on the line X—X of Figure 9, looking in the direction of the arrows; and Figure 11 is a cross-sectional view similar to Figures 4 and 7, but illustrating the third form of the invention.

The preferred forms of the present invention resemble in general the fender shield and mounting means therefor shown in the co-pending application of Herbert S. Jandus and Arthur P. Fergueson entitled "Fender shield," Serial No. 246,692, filed December 19, 1938, and assigned to the same assignee as the present invention. Like the fender shields disclosed in that application, the fender shields disclosed herein as examples of the present invention are applied to a fender by first being secured at the top of the wheel access opening in the side of the fender, so that the upper edge of the fender shield lies against the side of the fender. The fender shield is formed so that, when it is left only partially secured in place, it curves out away from the side of the fender at the bottom. The lower part of the fender shield is then flexed in flat against the side of the fender, and the two lower corners of the fender shield are secured in position against the side of the fender by means of bolts or other suitable fastening means.

The present invention, however, differs from those described in the above mentioned application in that the fender is designed to be used only with a fender shield and in that the means for attaching the fender shield to the fender are materially simplified.

The embodiment of the invention illustrated in Figures 1 to 6 comprises a stream-lined fender 15 having a conventional wheel access opening 16 in its depending outer side wall 17. The edge of the fender wall 17, along the bottom of the fender and around the wheel access opening 16, is curled under to form a reinforcing flange or trough 18 having an approximately semi-circular cross-section, as shown in Figures 3, 4 and 7.

The fender 15 differs from the conventional stream-lined fender in that it is provided with a pair of horizontally aligned slots 19 directly above the center of the wheel access opening 16 and in that outwardly projecting bolts or studs 21 are provided near the bottom of the fender ahead of and behind the wheel access opening 16. The wall 17 of the fender around the slots 19 is strengthened by a sheet-metal reinforcement or patch 22 spot-welded or otherwise secured on the inside of the fender and provided with apertures co-extensive with the apertures 19. The bolts 21 at the bottom of the fender are secured to the wall 17 of the fender in any suitable manner, as by welding, in order that they will remain in the proper position and will not turn as the nuts 23 are being screwed upon them.

The fender shield 24 comprises a sheet-metal panel 25 having its lower edge bent in horizontally to form a reinforcing flange 26 and having the remaining portion of its periphery bent over to form a reinforcing fold 27 adapted not only to strengthen the edge of the panel 25, but also to retain a rubber edging 28. The rubber edging 28 has a portion which lies between the fold 27 of the panel and the face of the fender wall 17, thus preventing metal-to-metal contact and obviating the possibility of squeaks or other noises.

The panel 25 is reinforced by a vertical stay 29 on its back, the lower end of the stay being formed into a flange or foot portion 31, riveted to the flange 26 at the bottom of the panel 25, and the upper end 32 of the stay fitting up into the recess formed at the top of the fender shield panel 24 by the folded-over upper edge 27, as shown in Figure 3. The upper end or head 32 of the stay 29 is formed with a pair of lugs projecting down and back away from the panel 25 and through the slots or apertures 19 in the wall 17 of the fender. It will be apparent from Figure 3 that the lugs 33 can be disengaged from the slots 19 or inserted therein by moving the fender shield 24 up or down, and that they will hold the fender shield 24 tightly against the side of the fender as long as the fender shield 24 is prevented from moving up from the position shown in Figure 3.

The bolts 21 at the bottom of the side wall 17 of the fender extend through openings 34 in the fender shield panel 25 and form one means of holding the fender shield down, and the flange 26 at the bottom of the fender shield panel 25 fits under the reinforcing flange 18 at the bottom of the fender and forms another means for holding the fender shield down, as shown in Figure 4. Thus, when the lower part of the fender shield 24 is in position, the lugs or tongues 23 at the top of the fender shield will be firmly held in the apertures 19 in the fender.

The bottom of the fender shield panel 25 is held in against the side of the fender by means of the nuts 23, shown in Figures 4, 5 and 6. As may be seen from these figures, the nuts 23 are formed with a hexagonal head portion 23a and a smaller cylindrical neck portion 23b and are placed upon their bolts or studs 21 with the neck portion 23b on the inside and bearing against the fender shield panel 25. This arrangement permits an ornamental molding strip 36 having a pair of inwardly directed flanged edges 37 to be placed over the nuts 23 and bolts 21, with the edges of the flange 37 extending in under the hexagonal heads 23a of the nuts 23 and bearing against the sides of the cylindrical portions 23b.

The molding strip 36 is formed of resilient metal, such as cold rolled steel or stainless steel, so that the flanges 37 frictionally grip the cylindrical necks 23b on the nuts and thus prevent the molding strip 36 from sliding accidentally. A short distance from each nut 23, the flanges 37 of the molding strip are cut away, as shown at 38 in Figure 6, so that, when the molding strip 36 is moved longitudinally to a position in which the cut-away places are concentric with the nuts 23, no portion of the flange 37 will extend behind the head portions 23a of the nuts. When in this position, the molding strip 36 may obviously be readily removed, thus permitting access to and removal of the nuts 23 in order to dismount the fender shield. In mounting the fender shield, the operations are reversed, the nuts 23 being first screwed onto the bolts 21 and then being covered and concealed by the molding strip 36. If desired, molding strips 38, similar to the molding strip 36 on the fender shield, may be provided on the fender ahead of and behind the fender shield 24, in order to enhance the ornamental appearance of the assembly.

A second form of the invention is illustrated in Figure 7. This form differs from that shown in Figures 1 to 6 only in that an acorn nut 41 is employed on the stud 21 for holding the bottom of the fender shield panel 25 in against the side wall 17 of the fender, and in that the molding strips 36 and 38 on the fender shield and fender are omitted.

Another form of the invention is illustrated in Figures 8 to 11. In this form of the invention, the fender shield 42 comprises a metal panel 43 having its lower edge folded in to form a horizontal reinforcing flange 44 and having the remaining portion of its edge bent over to provide a reinforcing fold 45. The fold 45 around the upper edge of the fender shield grips the edge of a rubber bead 46 having a thick portion 46a lying outside of the fold 45 between the main body of the panel 43 and the depending side 47 of the fender upon which the fender shield is mounted. The thick portion 46a of the rubber bead is thick enough to prevent metal-to-metal contact between the fender shield panel 43, including the reinforcing fold 45, and the side of the fender 47.

At the top of the fender shield, the folded-over edge 45 of the panel 43 carries a pair of downwardly and rearwardly projecting lugs or tongues 48 which extend obliquely down through slots or apertures 49 in the side 47 of the fender. The tongues 48 function in substantially the same way as the tongues 33 on the stay in the form of the invention illustrated in Figures 1 to 6, and the side 47 of the fender around the holes or apertures 49 is strengthened by a sheet metal reinforcement 51 spot-welded or otherwise secured on the inside of the fender in the same way as in the first form of the invention. It will be noted that the lugs 48 are formed integrally with the panel 43, thus making it unnecessary to provide a stay, such as the stay 29 shown in Figure 3, on the back of the panel.

In this form of the invention, the bolts 53 for holding in the lower corners of the fender shield are secured to the fender shield panel 43 and extend in through openings 54 in the wall 47 of the fender, instead of being secured to the fender and extending out through the fender shield. The heads 53a of the bolts 53 are on the outside of the fender shield and are concealed within an ornamental molding strip 55, the bolts 53 being held in position on the fender shield at all times by means of thin nuts 56 screwed up against the inner side of the fender shield panel 43. Easily operated nuts 57, each having an integral handle 57a, are provided on the bolts 53 on the inside of the fender 47. The provision of each nut 57 with a handle 57a not only makes it easy to tighten or loosen the nut 57 by reaching in under the edge of the fender and fender shield, but the weight of the handle 57a prevents the nut 57 from gradually turning itself loose when subjected to vibration during the operation of the vehicle upon which the fender shield is mounted.

While I have shown and described in detail only some of the preferred forms of my invention, it will, of course, be understood that many changes may be made without departing from the spirit of the invention. For example, other means than the bolts and nuts shown may be employed for holding in the bottom of the fender shield. These means may comprise latches or bolts, such as are shown in the above-mentioned patent application of Herbert S. Jandus and Arthur P. Fergueson, or may be any other suitable mechanism. The particular forms of rubber edging or bead shown in the illustrated examples of the invention may, if desired, be interchanged, or entirely different forms may be substituted. In any case, my invention includes not only these specific forms which have been described, but also any form of fender shield or combination thereof with a fender that falls within the terms of any one or more of the following claims:

I claim as my invention:

1. A fender shield comprising a panel adapted to cover the wheel access opening in the side of a fender, and a supporting tongue projecting obliquely back and down from a point below the upper edge of said panel, said tongue being located behind said panel and below the upper edge thereof.

2. A fender shield comprising a panel adapted to cover the wheel access opening in the side of a fender, said panel having the upper edge thereof folded down in back of the main portion thereof, and a supporting tongue projecting back and down from the lower edge of said folded edge, said tongue being located entirely behind said panel and below the upper edge thereof.

3. A fender shield comprising a panel adapted to cover the wheel access opening in the side of a fender, and a supporting member secured to the back of said panel, said supporting member comprising a tongue projecting back and down from near the upper edge of said panel and spaced therebelow and being located entirely behind said panel.

4. A fender shield comprising a panel adapted to cover the wheel access opening in the side of a fender, the upper edge of said panel being folded down in back of the main portion thereof, and the lower edge of said panel being formed into a reinforcing flange, a strut secured at the bottom to said reinforcing flange and having the upper end thereof located between said folded-over edge and the main portion of said panel, said strut having an integral supporting tongue projecting down and back from a point on said strut spaced below the top of said shield, said tongue being adapted to fit into an aperture in said fender and support said fender shield thereon.

HERBERT S. JANDUS.